United States Patent
Abbott et al.

(10) Patent No.: US 10,081,139 B2
(45) Date of Patent: *Sep. 25, 2018

(54) METHOD FOR IMPROVING LAMINATE QUALITY DURING RESIN TRANSFER MOLDING

(71) Applicant: UNITED TECHNOLOGIES CORPORATION, Hartford, CT (US)

(72) Inventors: Michael G Abbott, Jupiter, FL (US); Kathryn S Read, Colchester, CT (US); Christopher J Hertel, Wethersfield, CT (US)

(73) Assignee: United Technologies Corporation, Farmington, CT (US)

( * ) Notice: Subject to any disclaimer, the term of this patent is extended or adjusted under 35 U.S.C. 154(b) by 770 days.

This patent is subject to a terminal disclaimer.

(21) Appl. No.: 14/618,191

(22) Filed: Feb. 10, 2015

(65) Prior Publication Data

US 2016/0229130 A1    Aug. 11, 2016

(51) Int. Cl.
| | |
|---|---|
| *B29C 70/44* | (2006.01) |
| *B29C 70/48* | (2006.01) |
| *F16D 69/02* | (2006.01) |
| *C04B 35/80* | (2006.01) |
| *B29K 83/00* | (2006.01) |
| *B29K 105/08* | (2006.01) |

(52) U.S. Cl.
CPC ............ *B29C 70/443* (2013.01); *B29C 70/44* (2013.01); *B29C 70/48* (2013.01); *C04B 35/806* (2013.01); *F16D 69/023* (2013.01); *B29K 2083/00* (2013.01); *B29K 2105/0809* (2013.01); *B29K 2883/00* (2013.01); *C04B 2235/48* (2013.01); *C04B 2235/483* (2013.01); *C04B 2235/616* (2013.01)

(58) Field of Classification Search
None
See application file for complete search history.

(56) References Cited

U.S. PATENT DOCUMENTS

| | | | |
|---|---|---|---|
| 4,388,263 | A | 6/1983 | Prunty |
| 5,306,448 | A | 4/1994 | Kromrey |
| 5,738,818 | A | 4/1998 | Atmur et al. |
| 5,882,575 | A | 3/1999 | Atmur et al. |
| 6,086,814 | A | 7/2000 | Krenkel et al. |
| 6,167,859 | B1 | 1/2001 | Strasser et al. |

(Continued)

FOREIGN PATENT DOCUMENTS

| | | |
|---|---|---|
| EP | 0788468 A1 | 8/1997 |
| WO | 98/08779 A1 | 3/1998 |

OTHER PUBLICATIONS

European Search Report for EP Appln. No. 16155069.4 dated Jun. 16, 2016.

*Primary Examiner* — Monica Huson
(74) *Attorney, Agent, or Firm* — Bachman & LaPointe, P.C.

(57) ABSTRACT

A process for manufacturing a ceramic matrix composite component, said process comprising inserting at least one fibrous sheet into a resin transfer molding system. The process includes wetting the at least one fibrous sheet with a pre-ceramic polymer resin. The process includes applying a pressure to the at least one fibrous sheet and pre-ceramic polymer resin with an intensifier responsive to thermal expansion and curing the pre-ceramic polymer resin.

13 Claims, 1 Drawing Sheet

(56) References Cited

U.S. PATENT DOCUMENTS

| | | |
|---|---|---|
| 7,727,448 B2 | 6/2010 | Boutefeu et al. |
| 8,039,053 B2 | 10/2011 | Philippe et al. |
| 8,652,371 B2 | 2/2014 | Smith et al. |
| 8,721,954 B2 | 5/2014 | La Forest et al. |
| 2017/0100864 A1* | 4/2017 | Abbott .................... B29C 35/02 |

* cited by examiner

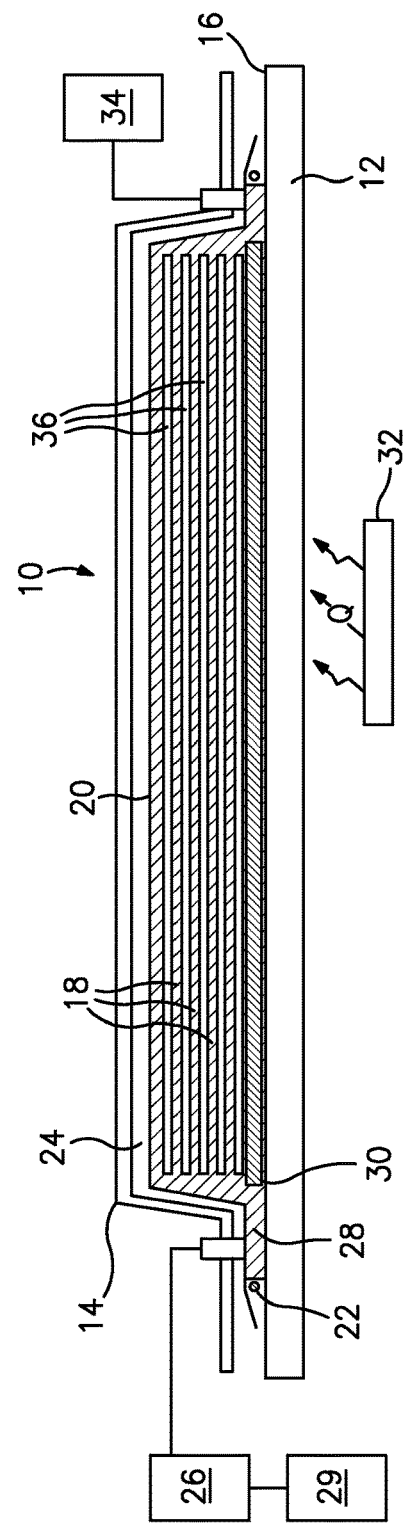

METHOD FOR IMPROVING LAMINATE QUALITY DURING RESIN TRANSFER MOLDING

BACKGROUND

The present disclosure is directed to the improved process of Resin Transfer Molding (RTM), and more particularly use of a silicone elastomer (or functionally equivalent) intensifier inside the closed RTM tool to provide additional pressure during processing, thereby suppressing void formation within the laminate and providing uniform consolidation pressure to ensure wet-out of the fiber preform.

Fiber-reinforced polymer matrix composites (PMCs) are high-performance structural materials that are commonly used in applications requiring resistance to aggressive environments, high strength/stiffness, and/or low weight. Examples of such applications include aircraft components.

PMCs comprise layers of fibers that are bonded together with a matrix material, such as a polymer resin. The fibers reinforce the matrix, bearing the majority of the load supported by the composite, while the matrix bears a minority portion of the load supported by the composite and also transfers load across the fibers. In this manner, PMCs may support greater loads than either the matrix or fiber individually while exhibiting a more progressive failure. Furthermore, by tailoring the reinforcing fibers in a particular geometry or orientation, the composite can be efficiently designed to minimize weight and volume.

In liquid infusion processing, the reinforcing fibers are placed within a mold cavity or other mechanism for net-shape tooling in dry conditions, wetted with the matrix resin, and cured. Liquid infusion processing may be accomplished by a variety of techniques, including high and low pressure Resin Transfer Molding (RTM), Resin Film Infusion (RFI), Vacuum Assisted Resin Transfer Molding (VARTM) and Same Qualified Resin Transfer Molding (SQRTM).

The liquid infusion process may include any process by which the reinforcing fibers are first placed into a mold cavity, die head, or any other means of net shaped tooling and then wetted with the resinous matrix and cured.

Ceramic Matrix Composite (CMC) pre-ceramic polymer resins are not chemically stable when heated to temperatures below their pyrolysis temperature and therefore provide a challenge to molding a void/defect free laminate via liquid infusion processes.

Prior to, during and even after initial cure the pre-ceramic resins have demonstrated a propensity for release of gaseous compounds. These gases interfere with the complete filling of the fiber preform during resin injection, leading to a cured laminate with varying amounts, sizes and shapes of porosity. Unwanted porosity can also be formed for other reasons, such as improper filling of the resins. It is known that during Polymer Infiltration and Pyrolysis (PIP), large pores in the cured laminate will propagate to the pyrolyzed laminate and may remain open within the laminate through final densification.

It is therefore desirable when using CMC pre-ceramic polymerresin to be able to cure a laminate by liquid infusion such that large pores are not present and the gas/porosity evolution is either suppressed or results in very small, finely dispersed porosity.

SUMMARY

In accordance with the present disclosure, there is provided a process for manufacturing a ceramic matrix composite component, said process comprising inserting at least one fibrous sheet into a resin transfer molding system. The process includes wetting the at least one fibrous sheet with a pre-ceramic polymer resin. The process includes applying a pressure to the at least one fibrous sheet and pre-ceramic polymer resin with an intensifier responsive to thermal expansion as the resin is heated to its cure temperature, thereby providing resistance to the evolution of gases from the resin before it fully hardens.

In another embodiment the intensifier is proximate the upper surface.

In another embodiment the intensifier is configured to expand responsive to thermal energy.

In another embodiment the intensifier comprises a cured elastomer having a high coefficient of thermal expansion.

In another embodiment the intensifier comprises a silicone rubber material.

In another embodiment a pump is fluidly coupled to the inner cavity and is configured to pump a resin into the inner cavity.

In another embodiment a flexible bag is insertable in the inner cavity between the cover plate and the intensifier and a seal is coupled between the cover plate and the tool and is configured to fluidly seal the inner cavity.

In another embodiment the intensifier is configured to apply a pressure against at least one fibrous sheet wet up with pre-ceramic polymer resin insertable into the inner cavity adjacent the intensifier.

In another and alternative embodiment a resin transfer molding system comprises a tool having an upper surface. A cover plate is coupled with the tool proximate the upper surface. An inner cavity is formed between the tool and the cover plate. An intensifier is located in the inner cavity and is thermally coupled to the tool. A thermal energy subsystem thermally coupled to the tool. At least one fibrous sheet wet-up with a pre-ceramic polymer resin is adjacent the intensifier. The intensifier is configured to pressurize the at least one fibrous sheet wet-up with a pre-ceramic polymer resin responsive to thermal expansion of the intensifier.

In another embodiment the intensifier is configured to suppress void formation resultant from gases formed in the pre-ceramic polymer resin.

In another embodiment the intensifier is configured to apply a pressure of from about 50 pounds per square inch (psi) to as high as 800 psi.

In another embodiment the pre-ceramic polymer resin is selected from the group consisting of polycarbosilanes and polysilazanes.

In another embodiment a thermal energy subsystem is thermally coupled to the tool, the thermal energy subsystem is configured to heat the intensifier.

In another embodiment at least one of a vacuum pump is fluidly coupled to the inner cavity; and a pump is fluidly coupled to the inner cavity; wherein the pump and the vacuum pump are configured to transport the resin into the inner cavity to wet-up the at least one fibrous sheet.

In another and alternative embodiment a process for manufacturing a laminate ceramic composite component comprises inserting at least one fibrous sheet into a resin transfer molding system. The process includes wetting the at least one fibrous sheet with a pre-ceramic polymer resin. The process includes applying a pressure to the at least one fibrous sheet and pre-ceramic polymer resin with an intensifier responsive to thermal expansion and curing the pre-ceramic polymer resin.

In an exemplary embodiment the process further comprises suppressing void formation resultant from gases formed in the pre-ceramic polymer resin.

In an exemplary embodiment the process further comprises encapsulating the at least one fibrous sheet and pre-ceramic polymer resin between the intensifier and a cover plate. The cover plate is coupled to a tool.

In an exemplary embodiment the intensifier comprises a cured elastomer having a high coefficient of thermal expansion.

In an exemplary embodiment the process further comprises heating the intensifier to induce a thermal expansion of the intensifier.

In an exemplary embodiment the process further comprises uniformly applying pressure to the at least one fibrous sheet and pre-ceramic polymer resin to ensure wet out and consolidation.

Other details of the resin transfer molding system and process are set forth in the following detailed description and the accompanying drawing wherein like reference numerals depict like elements.

BRIEF DESCRIPTION OF THE DRAWINGS

The FIG. 1 is a schematic representation of a resin transfer molding system.

DETAILED DESCRIPTION

Referring now to FIG. 1, there is illustrated a resin transfer molding system 10. The resin transfer molding system 10 is typically used to create a composite material that is constructed from a fibrous sheet that is impregnated with a resin. Although a composite material is shown and described, it is to be understood that the present invention can be used to create other parts which are formed by pressure and a tool. It is also noted that the resin transfer molding system 10 is shown as a flat shaped plate, other shapes and forms can be utilized depending on the ultimate final shape of the composite component.

The resin transfer molding system 10 includes a tool 12. The tool 12 can be constructed from composite materials, thin film metals, ceramics or conventional metallic materials. The tool 12 includes a cover plate 14 configured to enclose an upper surface 16 of the tool 12, encapsulate and seal the contents of the tool 12.

Adjacent to the tool 12 is at least one fibrous sheet 18, and shown as multiple sheets 18, which are used to create the composite material. The fibrous sheet can include any prepreg dry fabrics, tackified fabrics, three dimensional weave pieces, and other previously formed fiber filled sections.

The sheets 18 are enclosed by the cover plate 14. The cover plate 14 may be constructed from the same rigged material as the tool 12. The cover 28 may also include a flexible bag 20 made of a material, such as nylon, which can be sealed to the tool 12 with a seal 22.

The cover plate 14 and tool 12 define an inner cavity 24. The inner cavity 24 is in fluid communication with a pump 26 configured to pump a resin 28. The pump 26 may be capable of pressurizing the inner cavity 24. The pump 26 can be fluidly coupled to a source of resin 29.

The resin 28 is a material which binds and forms a composite with the fibrous material 18 when subjected to elevated temperatures and pressures. In exemplary embodiments, there are thermoset-type or thermoplastic-type pre-ceramic polymer resins. In an exemplary embodiment, the resin 28 is ceramic matrix composite pre-ceramic polymer resin. Examples of these pre-ceramic polymer resins include polycarbosilanes and polysilazanes. Common commercial resin systems include SMP-10, SMP-730 by Starfire Systems.

An intensifier 30 is included in the resin transfer molding system 10. The intensifier 30 comprises a cured elastomer such as silicone rubber material (or functional equivalent) having a high coefficient of thermal expansion that expands when heated. In an exemplary embodiment the coefficient of thermal expansion can be greater than 75 micro in/in Fahrenheit. The intensifier 30 is placed adjacent the upper surface 16 of the tool 12 proximate the fibrous sheets 18. The intensifier 30 is configured to apply pressure to the fibrous sheets 18 and resin 28 upon being heated.

To form a composite sheet, the fibrous sheets 18 are first placed onto the tool 12 on top of the intensifier 30 or vice versa. The cover plate 14 is then coupled to the tool 12 to encapsulate the sheets 18. The pump 26 is coupled to the tool 12. The tool 12 may be heated by a thermal energy subsystem 32 to remove any residual water that may exist in the sheet or tooling.

A vacuum is pulled within the inner cavity 24 of the tool 12 by a vacuum pump 34.

The resin 28 is introduced to the inner cavity 24 from the resin source. The resin can be induced to flow into the inner cavity 24 by the vacuum created within the tool inner cavity 24, by positively pumping the resin 28 into the inner cavity 24, or both. As shown in FIG. 1, the resin 28 fills the gaps 36 between the fibrous sheets 18.

As shown in FIG. 1, the resin 28 flows through the sheets 18 from the gaps 36. The diffusion of resin 28 from the gaps 36, more evenly distributes the resin 28 throughout the sheet 26 and provides a composite part that has a relatively uniform concentration of resin 28.

The tool 12 is heated from the thermal energy subsystem 32. The heat Q from the thermal energy subsystem 32 transfers through the tool 12 into the intensifier 30. As the intensifier 30 is heated, the intensifier 30 expands and presses the sheets 18 and resin 28 within the mold cavity. In an exemplary embodiment, the intensifier 30 can apply a pressure of from about 50 pounds per square inch (psi) to as high as 800 psi.

As explained above, prior to, during and even after initial cure the pre-ceramic resins 28 have demonstrated a propensity for release of gaseous compounds. These gases interfere with the complete filling of the fiber preform during resin injection, leading to a cured laminate with varying amounts, sizes and shapes of porosity.

The intensifier 30 suppresses the formation and release of the gaseous compounds in the laminate formed from the resin 28 and fibrous sheets 18. By suppressing the outgassing of the resin 28 with the use of the intensifier, unwanted voids and the resultant porosity is avoided in the composite material component. The intensifier 30 also improves the consolidation of the resin 28 and fibrous sheets 18. In an exemplary embodiment, the intensifier 30 improves the porosity to less than 2% by volume void content.

By use of the intensifier 30 inside the RTM system 10, additional internal pressure is provided to the composite material during the cure process, thereby minimizing void formation and providing uniform consolidation pressure to ensure wet-out of the fiber preform.

Using the ceramic matrix composite pre-ceramic polymer resin with the RTM process can result in large voids and defects in the cured laminate that propagate to the pyrolyzed laminate during PIP and are not filled during final densification. The disclosed resin transfer molding system enables one to cure a laminate by RTM using pre-ceramic polymer resin such that large pores are not present and the gas/porosity evolution is either suppressed or results in very small, finely dispersed porosity.

For final densification various processes can be employed such as; PIP, Melt Infiltration (MI) or Chemical Vapor Infiltration (CVI).

The resin transfer molding system and method (or functionally equivalent method) can be applicable to flat panels as well as complex 3-D geometric shapes including those forming functional components.

The exemplary resin transfer molding system is a closed tool process in which a dry fiber preform is enclosed in matched metal tooling and resin is injected under pressure to wet out the preform. The tool is then heated to cure the resin, resulting in a composite laminate. The system and process do not require any outside source of consolidation pressure, which lowers cost. The closed tooling creates a dimensionally repeatable part.

By minimizing the voids developed during cure, the exemplary system and method allow for the successful densification of the laminate through processes such as Polymer Infiltration and Pyrolysis (PIP), Melt Infiltration (MI) or Chemical Vapor Infiltration (CVI). A highly dense material is critical to the durability of the material.

Without the use of the exemplary resin transfer molding system and method a more porous Ceramic Matrix Composite (CMC) would result, the greater porosity compromising the composite and the capacity of the composite to meet target life requirements and ultimately increasing cost.

There has been provided a resin transfer molding system and process. While the resin transfer molding system and process have been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A resin transfer molding system comprising:
    a tool having an upper surface;
    a cover plate coupled with said tool proximate said upper surface;
    an inner cavity formed between said tool and said cover plate;
    an intensifier located in said inner cavity and thermally coupled to said tool;
    a thermal energy subsystem thermally coupled to said tool; and
    a vacuum pump fluidly coupled to said inner cavity.

2. The system according to claim 1, wherein said intensifier is proximate said upper surface.

3. The system according to claim 1, wherein said intensifier is configured to expand responsive to thermal energy.

4. The system according to claim 1, wherein said intensifier comprises a cured elastomer having a high coefficient of thermal expansion.

5. The system according to claim 1, wherein said intensifier comprises a silicone rubber material.

6. The system according to claim 1, further comprising a pump fluidly coupled to said inner cavity and configured to pump a resin into said inner cavity.

7. The system according to claim 1, further comprising:
    a flexible bag insertable in said inner cavity between said cover plate and said intensifier; and
    a seal coupled between said cover plate and said tool and configured to fluidly seal said inner cavity.

8. The system according to claim 1, wherein said intensifier is configured to apply a pressure against at least one fibrous sheet wet up with pre-ceramic polymer resin insertable into said inner cavity adjacent said intensifier.

9. A resin transfer molding system comprising:
    a tool having an upper surface;
    a cover plate coupled with said tool proximate said upper surface;
    an inner cavity formed between said tool and said cover plate;
    an intensifier located in said inner cavity and thermally coupled to said tool;
    a thermal energy subsystem thermally coupled to said tool; and
    at least one fibrous sheet wet-up with a pre-ceramic polymer resin adjacent said intensifier; wherein said intensifier is configured to pressurize said at least one fibrous sheet wet-up with a pre-ceramic polymer resin responsive to thermal expansion of said intensifier.

10. The system according to claim 9, wherein said intensifier is configured to suppress void formation resultant from gases formed in said pre-ceramic polymer resin.

11. The system according to claim 9, wherein said intensifier is configured to apply a pressure of from about 50 pounds per square inch (psi) to as high as 800 psi.

12. The system according to claim 9, wherein said pre-ceramic polymer resin is selected from the group consisting of polycarbosilanes and polysilazanes.

13. The system according to claim 9, further comprising:
    a thermal energy subsystem thermally coupled to said tool, said thermal energy subsystem configured to heat said intensifier
    at least one of a vacuum pump fluidly coupled to said inner cavity; and
    a pump fluidly coupled to said inner cavity; wherein said pump and said vacuum pump are configured to transport said resin into said inner cavity to wet-up said at least one fibrous sheet.

* * * * *